(12) United States Patent
Petracca et al.

(10) Patent No.: US 11,165,346 B2
(45) Date of Patent: Nov. 2, 2021

(54) CONVERTER CIRCUIT, CORRESPONDING ELECTRONIC COMPONENT, DEVICE AND METHOD

(71) Applicant: STMicroelectronics S.r.l., Agrate Brianza (IT)

(72) Inventors: Giacomo Petracca, Milan (IT); Simone Bellisai, Milan (IT); Marco Borghese, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 89 days.

(21) Appl. No.: 16/583,845

(22) Filed: Sep. 26, 2019

(65) Prior Publication Data
US 2020/0119643 A1   Apr. 16, 2020

(30) Foreign Application Priority Data

Oct. 10, 2018  (IT) .................. 102018000009323

(51) Int. Cl.
*H02M 1/08*   (2006.01)
*H02M 3/158*   (2006.01)

(52) U.S. Cl.
CPC ............ *H02M 3/158* (2013.01); *H02M 1/08* (2013.01)

(58) Field of Classification Search
CPC .......... H02M 3/158; H02M 1/08; H02M 1/32; H02M 1/081–084; H02M 3/1588; H02M 3/155; H02M 3/1582; H02M 3/157; H02M 3/1563; H02M 2003/1566; H02M 2003/1557; H02M 2001/0012; H02M 2001/0009; H02M 2001/385; H04B 2215/069
See application file for complete search history.

(56) References Cited

U.S. PATENT DOCUMENTS

| 2013/0162228 | A1 | 6/2013 | Menegoli et al. |
| 2015/0280557 | A1 | 10/2015 | Xue et al. |
| 2017/0279376 | A1* | 9/2017 | Siri .................. H02M 1/42 |
| 2018/0294721 | A1* | 10/2018 | Abe ................ H02M 3/158 |
| 2019/0393796 | A1* | 12/2019 | Fukushima .......... H02H 7/1213 |

FOREIGN PATENT DOCUMENTS

EP   1826893 A1   8/2007

* cited by examiner

*Primary Examiner* — Thienvu V Tran
*Assistant Examiner* — Lorena D Bruner
(74) *Attorney, Agent, or Firm* — Slater Matsil, LLP

(57) ABSTRACT

A converter circuit includes an input node for receiving an input signal and an output node for providing a converted output signal to a load, a switching power stage to receive the input signal and an on-off drive signal switching between an on-state and an off-state, and a reactive output network coupled to the switching power stage and configured to provide the converted output signal to the load. The converter circuit comprises a first feedback signal path configured to generate a PWM-modulated control signal for the switching power stage as a function of the converted output signal, and a second feedback signal path including an output variation sensing circuit to generate at least one output variation signal indicative of variations of the converted output signal over time.

20 Claims, 10 Drawing Sheets

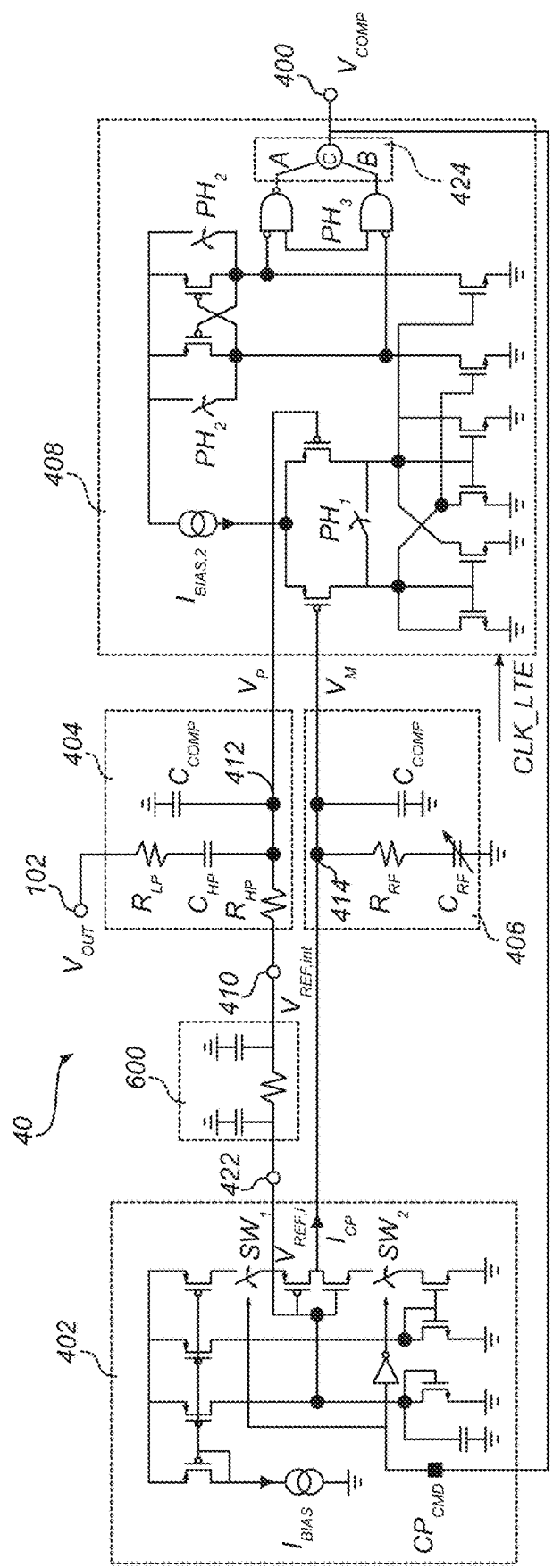
Fig. 6
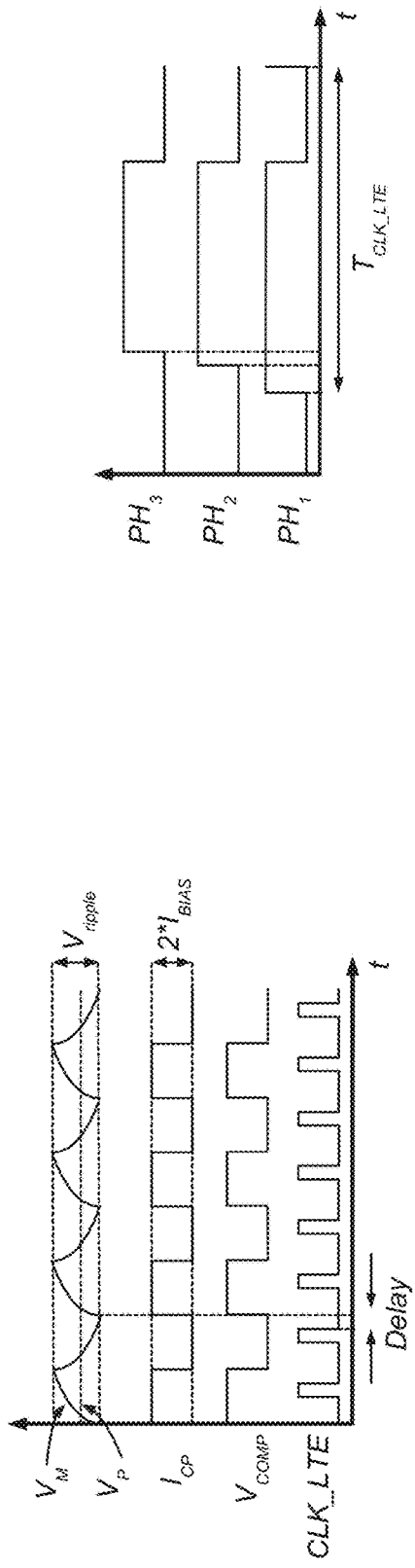
Fig. 7a
Fig. 7b

CONVERTER CIRCUIT, CORRESPONDING ELECTRONIC COMPONENT, DEVICE AND METHOD

CROSS-REFERENCE TO RELATED APPLICATIONS

This application claims priority to Italian Patent Application No. 102018000009323, filed on Oct. 10, 2018, which application is hereby incorporated herein by reference.

TECHNICAL FIELD

The description relates to switching converter circuits, e.g. DC/DC fixed-frequency switching converter circuits.

One or more embodiments may be applied, for instance, to circuits for improving the output dynamic performance of switching converters, e.g. improving output regulation during load transients.

One or more embodiments may be applied, for instance, to power management integrated circuits (PMIC) comprising plural switching converter circuits.

BACKGROUND

Switching converters operating according to various operating schemes are known in the art.

For instance, so-called constant on-time switching DC/DC converters are known. Such constant on-time switching DC/DC converters typically provide good dynamic output performance, e.g. good load transient regulation. On the other hand, constant on-time switching DC/DC converters can interact in an undesired manner due to their asynchronous operation, generating excessive noise and interferences.

Other switching converters are known under the designation of fixed-frequency (voltage mode) switching DC/DC converters. Such fixed-frequency converters are less affected by noise if compared to constant on-time converters, but typically provide worse dynamic output performance, e.g. worse load transient regulation.

Recent market developments are requesting development of power management integrated circuits (PMIC) comprising plural switching converters, e.g. plural switching converters fabricated on the same silicon die, with the aim of supplying different points of load (i.e., providing different voltage levels at different output terminals/pins of a same power management integrated circuit) with increased current requirements. For instance, the output current provided by one or more switching converters in a power management integrated circuit may be rather high, in order to provide satisfactory output power capability even at low voltages.

Such power management integrated circuits may comprise plural constant on-time converters and/or fixed-frequency converters.

Despite providing good dynamic output performance, power management integrated circuits comprising plural constant on-time converters may suffer from malfunctions.

For instance, different converters may tend to switch unexpectedly at unwanted instants due to noise internal to the integrated circuit. For instance, switching operation of a certain converter may generate noise that triggers (undesired) switching of other converters. One or more converters may thus tend to "couple" themselves, e.g. operating together and at the same frequency, resulting in simultaneous commutations and consequently in converters crosstalk, increased supply current, electromagnetic interferences and power supply bouncing.

Moreover, plural converters operating at the same time in a same integrated circuit should be phase-shifted in order to result in rather uniform current demand. Constant on-time converters may not be suitable for satisfying such operating condition, due to their possible undesired synchronized operation described above.

On the other hand, power management integrated circuits comprising plural fixed-frequency converters may not be suitable for applications which require good output dynamic performance, such as applications with fast and/or large load transient variations, despite facilitating integrating and/or interleaving plural fixed-frequency converters on the same integrated circuit due to better noise immunity.

In this context, document EP 1 826 893 A1 is indicative of the state of the art relating to fixed-frequency switching converters with improved output dynamic performance, e.g. improved load transient regulation.

SUMMARY

Despite the extensive activity in the area, further improved solutions are desirable.

For instance, solutions are desirable which may provide improved output dynamic performance, e.g. improved load transient regulation, in fixed-frequency switching converters.

Another desirable feature is providing circuits for modulating the entity of the output regulation of a switching converter as a function of the amplitude and/or slope of load transient steps.

Another desirable feature is providing circuits for managing the output regulation of a switching converter with reduced systematic inaccuracies.

Another desirable feature is providing circuits for managing the output regulation of a switching converter with reduced sensitivity to the shape of the ripple of the output signal.

Solutions are desirable which may not require any external circuit component, thus being fully integrated on silicon.

Moreover, solutions are desirable which may facilitate integrating plural fixed-frequency switching converters in single power management integrated circuits.

An object of one or more embodiments is to contribute in providing such improved solutions.

According to one or more embodiments, such an object can be achieved by means of a circuit having the features set forth in the claims that follow.

One or more embodiments may relate to a corresponding electronic component.

One or more embodiments may relate to a corresponding device.

One or more embodiments may relate to a corresponding method.

The claims are an integral part of the technical teaching provided herein in respect of the embodiments.

One or more embodiments may provide a switching converter circuit configured for sensing variations of the converted output signal with a dedicated feedback loop working at a frequency which is higher than the switching frequency of the converter, thus facilitating adapting the switching activity of the converter circuit to fast and/or large output load variations, thereby increasing (temporarily) the operating bandwidth of the converter.

In one or more embodiments, such dedicated feedback loop may have a negligible impact on the overall power consumption of the converter circuit.

One or more embodiments may provide a solution for integrating, on a same die, plural switching converters having robust operation against noise and improved dynamic output performance.

BRIEF DESCRIPTION OF THE DRAWINGS

One or more embodiments will now be described, by way of example only, with reference to the annexed figures, wherein:

FIG. 6 is exemplary of possible implementation details of embodiments;

FIGS. 7a, 7b, 8 and 9a are exemplary of possible time behavior of signals in embodiments;

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
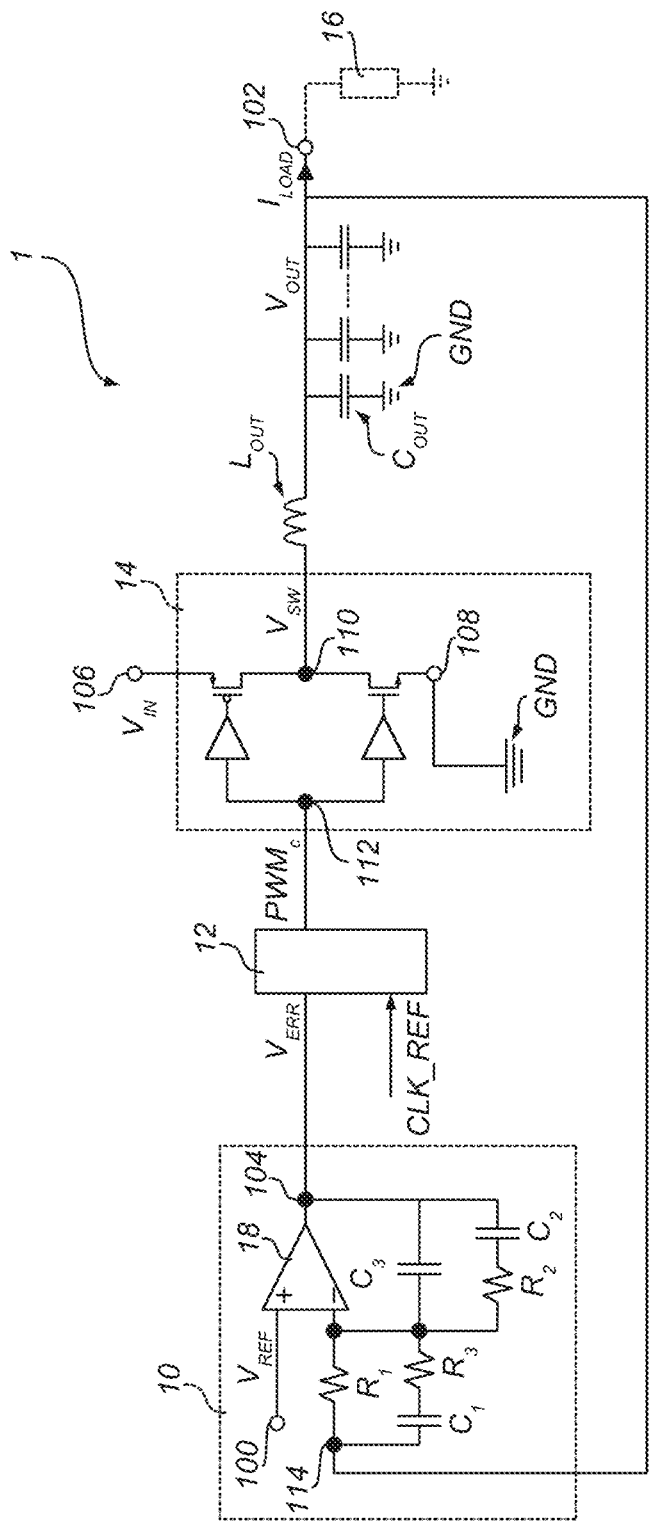
FIG. 1 is exemplary of a circuit architecture of a switching converter having a main feedback loop.

By way of introduction to a detailed description of exemplary embodiments, reference may be first had to FIG. 1.

FIG. 1 is exemplary of a circuit architecture of a switching converter 1, particularly a buck converter, having a voltage mode main control loop (or main feedback loop) from an output node 102 to a feedback input node 114.

It will be appreciated that reference to a buck converter in the present description is by way of example only, and that one or more embodiments may be applied to other type of switching converters (e.g., boost converters, buck-boost converters, etc.).

It will be noted that the circuit architecture exemplified in FIG. 1 may apply to both fixed-frequency and constant on-time switching converters.

As exemplified in FIG. 1, a switching converter 1 may have a switching stage 14 providing a switching signal $V_{SW}$ at a node 110. A reactive output network of the converter 1 may comprise an inductor $L_{OUT}$ coupled between the node 110 and the output node 102, and one or more output capacitors $C_{OUT}$ coupled between the output node 102 and a (ground) reference terminal GND.

An output load 16 may be coupled between the output node 102 and the (ground) reference terminal GND. It will be appreciated that the output load 16 may be a distinct element from the embodiments.

In the converter 1, a feedback circuit block 10 may receive at a first respective input node 100 a reference (voltage) signal $V_{REF}$ and at a second respective input node 114 the output (voltage) signal $V_{OUT}$ sensed at node 102.

The feedback circuit block 10 may comprise a differential circuit 18, e.g. an error amplifier, for comparing the output (voltage) signal $V_{OUT}$ to the reference (voltage) signal $V_{REF}$, thereby generating an error signal $V_{ERR}$.

The feedback circuit block 10 may comprise a compensation network (see, for instance, the resistive components $R_1$, $R_2$, $R_3$ and the capacitive components $C_1$, $C_2$, $C_3$ in FIG. 1), e.g. a type-III compensation network known per se. Such compensation network may facilitate compensating the converter 1, e.g. compensating the conjugate complex poles introduced in the transfer function of the converter 1 by the reactive output elements $L_{OUT}$ and $C_{OUT}$. The compensation network may also facilitate fixing the closed loop bandwidth of the converter 1 and providing a high gain at low frequencies as a result of the differential circuit 18 being in an integrator configuration, thus resulting in a negligible difference between the values of the signals $V_{OUT}$ and $V_{REF}$ at steady-state condition.

In the converter 1, the error signal $V_{ERR}$ provided at the output of the differential circuit 18 at node 104 is received at an input of a modulator circuit block 12 which generates, at a node 112, a PWM-modulated signal $PWM_c$ for driving the switching stage 14.

In case the converter 1 is a constant on-time converter, the modulator circuit block 12 may comprise, according to a conventional arrangement, a constant $T_{ON}$ modulator and a secondary frequency-locked loop (FLL) which aims at maintaining a constant switching frequency when the converter 1 operates in a steady-state condition. In one or more embodiments, the constant $T_{ON}$ modulator may comprise a STVCOT™ controller as available with companies of the ST group (group of companies of the Assignee).

Therefore, in converters based on a constant on-time architecture, the converter switching frequency may be driven by a frequency-locked loop (FLL) with the aim of operating the converter 1 in a "pseudo fixed-frequency" mode.

As previously noted, in case that plural constant on-time converters are included on a same die (or in the same integrated circuit), precise control of the switching phases of such plural converters may be hard to achieve, resulting in the converters possibly switching at undesired instants, e.g. together.

In case the converter 1 is a fixed-frequency converter, the modulator circuit block 12 may comprise, according to a conventional arrangement, a fixed-frequency ramp generator circuit and a $T_{ON}$ comparator which compares the error signal $V_{ERR}$ provided at the output of the differential circuit 18 with the ramp signal generated by the ramp generator circuit, thereby providing a PWM-modulated signal $PWM_c$ for driving the switching stage 14.

In such fixed-frequency architecture, if a load change (e.g., an increase or decrease of the current $I_{LOAD}$ provided at the output load 16 through the output node 102) occurs during the converter OFF time, the modulator circuit block 12 may be unable to sense such load change until the successive converter ON time, which is driven by a clock signal CLK_REF received at the modulator circuit block 12.

Generally, the clock signal CLK_REF may be assumed a low-frequency signal if compared to the time-scale of the variations expected on the output load 16 (e.g., the clock signal CLK_REF may have a period of about 1 µs, with 1 µs=$10^{-6}$ s, and load variations may take place in hundreds of ns, with 1 ns=$10^{-9}$ s).

In case the clock signal CLK_REF is a low frequency signal (as is the case, for instance, in many high-current applications) and/or the ratio $V_{IN}/V_{OUT}$ between the input signal at node 106 and the output signal at node 102 of the converter 1 is large (as is the case in many low-voltage applications, e.g. when using the converter 1 for supplying the core of a microcontroller or memory modules in the range of 0.8 V to 3.3 V from a 12 V PCIe or SATA bus), the duty cycle of the PWM-modulated signal $PWM_c$ driving the switching stage 14 of the converter 1 may be quite low.

As a result of a low duty cycle of the signal $PWM_c$ at node 112, the converter OFF time may be large and the output voltage $V_{OUT}$ may vary considerably as a result of a load change occurring during the converter OFF time (and not being sensed until the successive converter ON time).

In order to limit such variations of the output voltage $V_{OUT}$, large capacitor arrays may be provided coupled at the output node 102, which however may increase the cost and area occupation of the converter 1.

Therefore, in one or more embodiments, solutions are provided for improving output load transient regulation in fixed-frequency switching converters, possibly reducing the need for large capacitor arrays at the output node 102.

Figure 2:
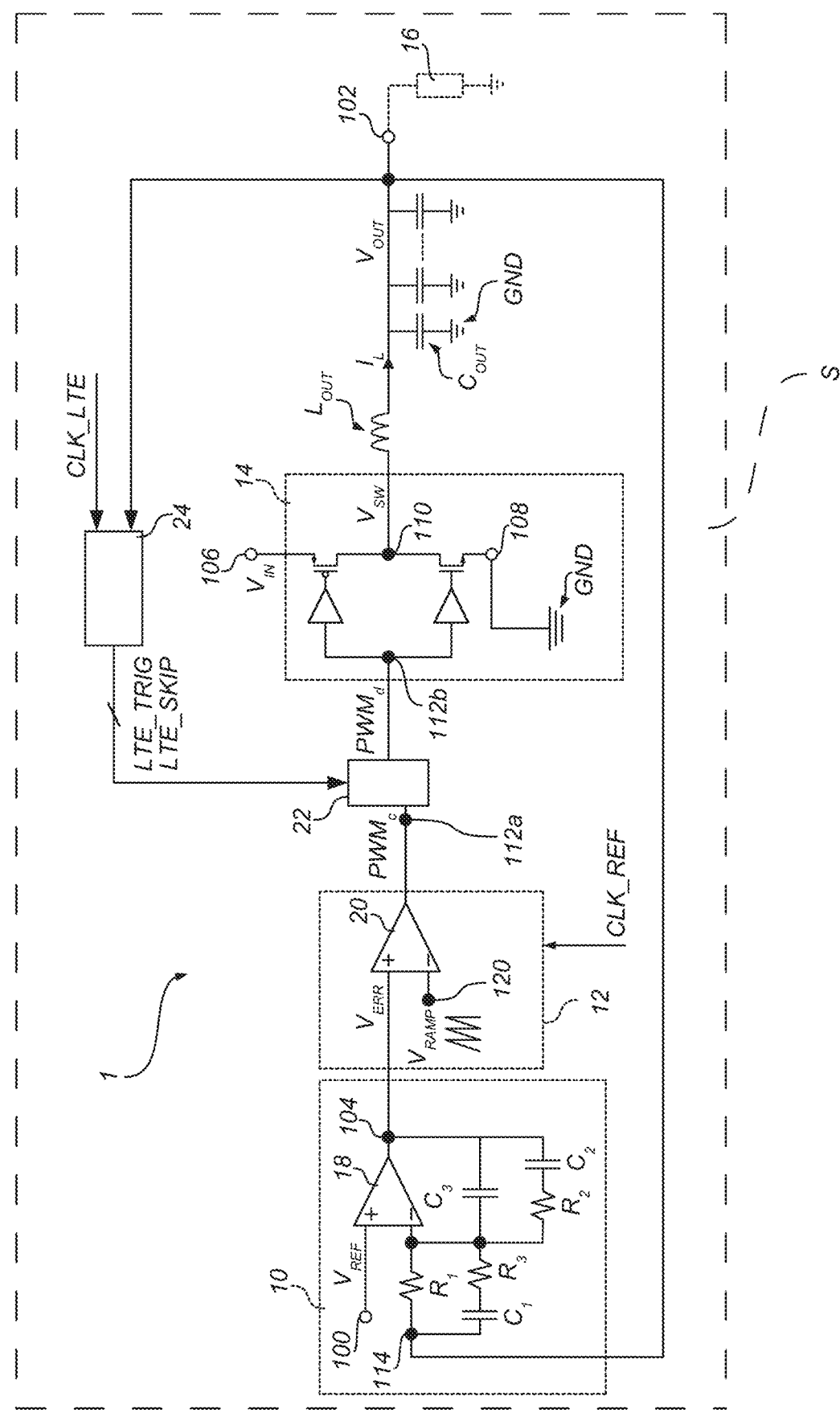
FIG. 2 is exemplary of a circuit architecture of a switching converter according to embodiments, having an additional feedback loop.

In one or more embodiments of a converter 1 as exemplified in FIG. 2, an additional feedback loop is provided between the output node 102 and the input node 112b of the switching stage 14.

Throughout the figures annexed herein, like parts or elements are indicated with like references/numerals and a corresponding description will not be repeated for brevity.

A converter circuit 1 according to one or more embodiments may be integrated (in a manner known to those skilled in the art) into a substrate S. In one or more embodiments, such a substrate S can be shared by various converter circuits as exemplified herein, integrated into such a common substrate S.

In one or more embodiments, an additional feedback loop may comprise a sensing circuit block 24 having an input coupled to the output node 102 of the converter 1, and the converter circuit 1 may comprise a control circuit block 22 for coupling the output nodes of both the main and additional feedback loops to the input node 112b of the switching stage 14, thereby providing a drive signal $PWM_d$ to the switching stage 14.

The sensing circuit block 24 may be configured to sense the output signal $V_{OUT}$ at node 102 and/or the output current provided to the load 16. In particular, the sensing circuit block 24 may be configured to sense high frequency variations of the output signal $V_{OUT}$ and/or of the output current provided to the load 16, thereby generating digital control signals LTE_TRIG and LTE_SKIP, according to the operation described in the following.

The control circuit block 22 may be configured to sense the digital control signals LTE_TRIG, LTE_SKIP from the sensing circuit block 24, and control the switching operation of the switching stage 14 by means of a signal $PWM_d$ generated as a function of such digital control signals LTE_TRIG, LTE_SKIP and of the PWM-modulated signal $PWM_c$ from the modulator circuit block 12.

In one or more embodiments, the additional feedback loop (also called LTE loop in the present description) may facilitate extending the bandwidth of the converter 1 with respect to previous solutions as exemplified in FIG. 1, thus resulting in the possibility of operating the converter 1 at higher frequencies.

Figure 3:
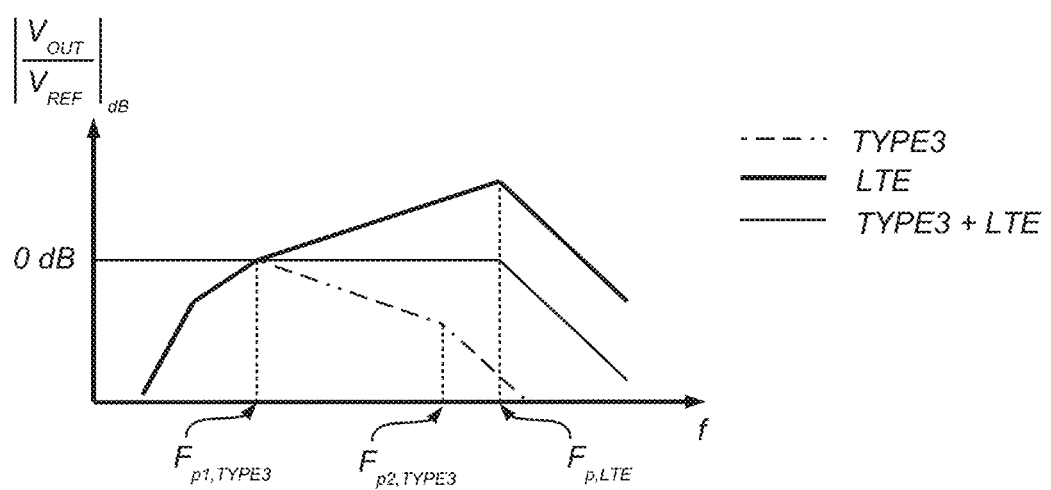
FIG. 3 is exemplary of possible frequency response of embodiments.

For instance, FIG. 3 is exemplary of a comparison between the frequency response of a conventional "type-III" converter according to FIG. 1 and a "type-III+ LTE" converter according to one or more embodiments of the present description.

FIG. 3 is exemplary of the amplitude of the transfer function $V_{OUT}/V_{REF}$ for both a "type-III" converter (dashed and dotted line) and a "type-III+ LTE" converter (thin solid line), and shows that the bandwidth of a converter 1 according to one or more embodiments may be extended up to a frequency $F_{p,LTE}$ which is higher than the frequency $F_{p1, TYPE3}$ that limits the bandwidth of a conventional "type-III" converter.

Figure 4:
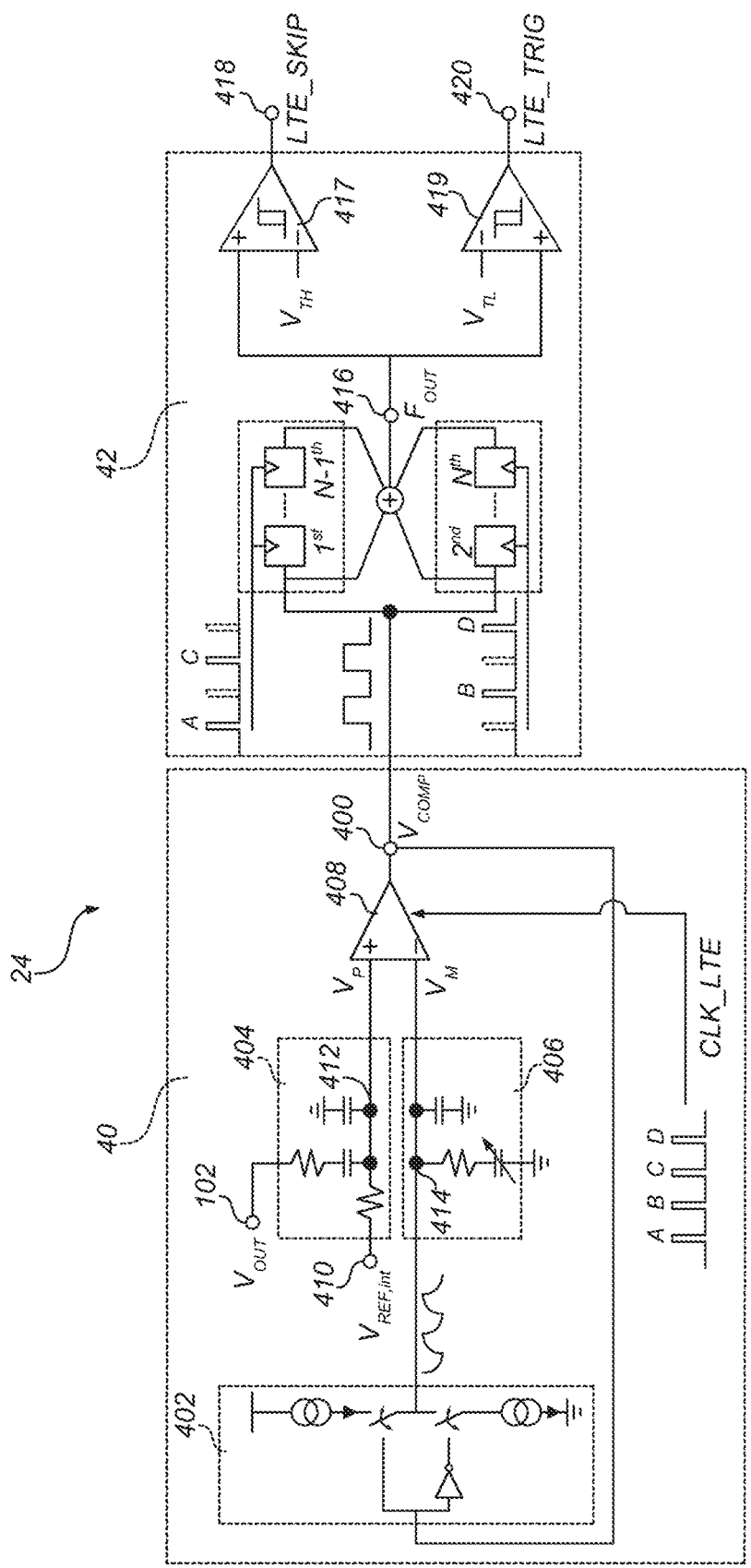
FIG. 4 is exemplary of possible implementation details of embodiments.

FIG. 4 is exemplary of a possible implementation of a sensing circuit block 24 in one or more embodiments.

A sensing circuit block 24 may comprise a sensing portion 40 having a first input node 102 configured to receive the output signal $V_{OUT}$, a second input node 410 configured to receive an (internal) reference signal $V_{REF,int}$, and an output node 400 providing a digital signal $V_{COMP}$.

It will be noted that the reference signal $V_{REF,int}$ may be generated internally to the sensing portion 40, or alternatively may be generated externally. In one or more embodiments, generating the reference signal $V_{REF,int}$ internally may result in reduced power consumption.

A sensing circuit block 24 may comprise a filter portion 42 having an input node coupled to the output node 400 of the sensing portion 40, and providing the digital control signals LTE_SKIP and LTE_TRIG at respective output nodes 418, 420.

Operation of a sensing circuit block 24 in one or more embodiments, which will be better detailed in the following, may be described with reference to the exemplary signals illustrated in FIG. 5.

Figure 5:
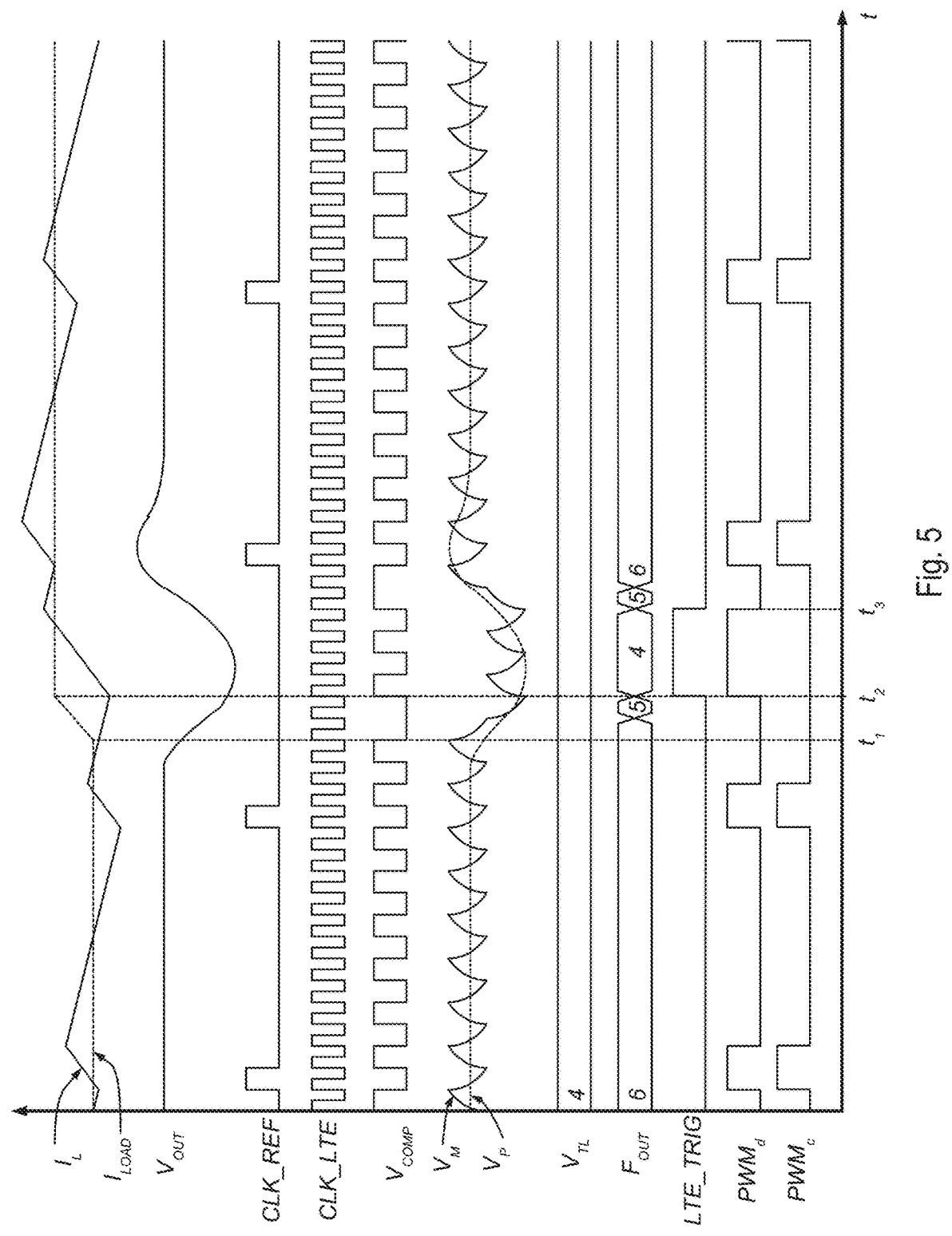
FIG. 5 is exemplary of possible time behavior of signals in embodiments.

For instance, as exemplified in FIG. 5, in case a positive load current step (i.e., a steep increase of the output current $I_{LOAD}$ due to a load transient, generating a sharp decrease of the output voltage $V_{OUT}$) happens during an OFF time of a converter 1 involving a fixed-frequency architecture (i.e., while the PWM-modulated signal $PWM_c$ is low, see instant $t_1$ to $t_2$ in FIG. 5), the sensing circuit block 24 may be configured to force an "extra" ON time of the converter 1

(see instant $t_2$ to $t_3$ in FIG. 5) by forcing the drive signal $PWM_d$ received at the switching stage 14 to a high value.

In one or more embodiments, forcing an "extra" ON time of the converter 1 may result in a smooth output signal $V_{OUT}$ as a result of a filtering operation performed by the filter portion 42.

It is noted that, in one or more embodiments, the frequency of the clock signal CLK_LTE provided to the sensing circuit block 24 for its operation may be higher than the frequency of the clock signal CLK_REF controlling operation of the modulator circuit block 12.

For instance, the frequency of the clock signal CLK_LTE may be an order of magnitude higher than the frequency of the clock signal CLK_REF, thus resulting in satisfactory improvement of the output dynamic performance of the converter 1 during load steps (see, for instance, FIG. 5).

A possible detailed embodiment of a sensing portion 40 of a sensing circuit block 24 in one or more embodiments are exemplified in FIG. 6.

In one or more embodiments, a sensing portion 40 may comprise an analog sensor circuit configured to operate as a delta modulator. Such sensing portion 40 may be configured to sense variations of the (voltage) signal $V_{OUT}$ at a feedback node 102 of the converter 1, e.g. being sensitive to voltage variations in the order of few mV, and generate an output digital signal $V_{COMP}$ at a node 400 indicative of said variations of the (voltage) signal $V_{OUT}$.

In one or more embodiments, a sensing portion 40 may comprise:

an input node 102 configured for receiving an analog feedback (voltage) signal $V_{OUT}$ from the converter 1;

an output node 400 configured for providing an output digital signal $V_{COMP}$;

a charge pump circuit block 402, configured for receiving the output digital signal $V_{COMP}$ as a control signal for operation of switches $SW_1$, $SW_2$, and for providing an output (voltage) signal $V_{REF,i}$ and an output (current) signal $I_{CP}$ at respective nodes 422 and 414;

a filter circuit block 600, having an input coupled to node 422 and providing the internal (filtered) reference signal $V_{REF,int}$ at node 410;

a band-pass filter circuit block 404, configured for receiving the feedback (voltage) signal $V_{OUT}$ at node 102 and the internal reference (voltage) signal $V_{REF,int}$ at node 410, and providing at a node 412 an output (voltage) signal $V_P$ indicative of the feedback (voltage) signal $V_{OUT}$;

a tunable impedance circuit block 406, herein named ripple filter circuit block 406, configured for transducing the (current) signal $I_{CP}$ provided by the charge pump circuit block 402 into a (voltage) signal $V_M$ at node 414; and a (three-phase) comparator circuit block 408, configured for receiving signals $V_P$ and $V_M$ at respective nodes 412 and 414 and providing the output digital signal $V_{COMP}$ as a result of (clocked) comparison of signals $V_P$ and $V_M$, the comparator circuit block 408 operating at the frequency of the clock signal CLK_LTE.

In one or more embodiments, the sensing portion 40 may be designed with the aim of reducing power consumption, e.g. down to 500 nA/MHz, and setting the input root mean square (rms) noise limit of the comparator circuit block 408, e.g. down to $V_{ripple}/4$, wherein $V_{ripple}$ is the amplitude of the ripple superposed to the signal $V_M$ at the input of the comparator 408.

In one or more embodiments as exemplified in FIG. 6, during operation at steady-state condition of the converter 1, as a result of the signal $V_{OUT}$ not varying, the signal $V_P$ at node 412 may have a (constant) DC value approximately equal to the value $V_{REF,int}$.

As a result of the comparator 408 being a clocked comparator, considering—for the sake of simplicity only—an ideal operation of the feedback loop, the signal $V_M$ at node 414 may oscillate around the value of signal $V_P$.

Such oscillating behavior of the signal $V_M$ around the value of signal $V_P$ may be explained as follows, also with reference to the exemplary signals of FIG. 5.

As a result of the output digital signal $V_{COMP}$ at node 400 being high, the charge pump circuit block 402 may inject a (small) current $I_{CP}$, e.g. 1 µA, into the node 414 to charge the ripple filter circuit block 406. The ripple filter circuit block 406 may be dimensioned (e.g., by choosing the values of the resistive and capacitive components $R_{RF}$, $C_{RF}$, $C_{COMP}$ therein) in such a way that the signal $V_M$ increases and passes above the threshold value $V_P$ in a clock period due to the current $I_{CP}$ flowing from node 414 to ground. Therefore, at a successive rising edge of the clock signal CLK_LTE, the signal $V_M$ may be higher than $V_P$ and the output digital signal $V_{COMP}$ of the comparator 408 may change its status (i.e., may commute to low).

As a result of the output digital signal $V_{COMP}$ of the comparator 408 being low, the charge pump circuit block 402 may sink a current $I_{CP}$ from node 414 to discharge the ripple filter circuit block 406, thus resulting in the signal $V_M$ decreasing and passing below the threshold value $V_P$ in a clock period. Thus, at a successive rising edge of the clock signal CLK_LTE, the signal $V_M$ may be lower than $V_P$ and the output digital signal $V_{COMP}$ of the comparator 408 may change its status again (i.e., may commute to high).

Therefore, in one or more embodiments, dimensioning of the ripple filter circuit block 406 may result in the clocked comparator 408 having its input differential signal (e.g., $V_P - V_M$) changing sign at each clock cycle of the clock signal CLK_LTE as a result of the comparator 1 operating in steady-state condition (i.e., without output load variations).

Therefore, a continuous oscillation with a hysteretic behavior may be generated in the control loop of the sensing portion 40 providing the control signal $CP_{CMD}$, and the output digital signal $V_{COMP}$ of the comparator 408 may oscillate with an average duty cycle of approximately 50% at a frequency which is half of the clock frequency CLK_LTE (see, e.g., signals $V_P$, $V_M$, $V_{COMP}$, CLK_LTE in FIG. 5).

As a result of the signal $V_{OUT}$ varying, the steady-state condition of the converter 1 is not valid anymore. In one or more embodiments as exemplified in FIG. 6, as a result of the signal $V_{OUT}$ varying, the average duty-cycle of the digital signal $V_{COMP}$ at the output node 400 of the sensing portion 40 may change.

For instance, as exemplified in FIG. 6, the signal $V_{OUT}$ decreasing may result in the signal $V_{COMP}$ having a duty-cycle lower than 50%. Similarly, the signal $V_{OUT}$ increasing may result in the signal $V_{COMP}$ having a duty-cycle higher than 50%.

FIG. 7a is exemplary of possible time behavior of signals $V_P$, $V_M$, $V_{COMP}$, CLK_LTE and $I_{CP}$ in one or more embodiments as exemplified in FIG. 6, wherein the possibility of having a delay between the edges of the clock signal CLK_LTE and the commutations of the signal $V_{COMP}$ at the output of the comparator 408 is shown. Such delay may be due, for instance, to the propagation delays in the circuit that implements the comparator 408. Since the signal $V_{COMP}$ may be sampled by the filter portion 42 at edges of the clock signal CLK_LTE, the response of the system may not be dependent on the comparator delay.

FIG. 7b is exemplary of possible time behavior of signals $PH_1$, $PH_2$, $PH_3$ in a 3 phase clocked comparator 408 in one or more embodiments as exemplified in FIG. 6. The signal $PH_1$ enables the first stage of the comparator 408 (e.g., a differential couple). The signal $PH_2$ is enabled after a certain time needed (from analog simulations) to make it switch. At the regime of stage 2, the output of the analog comparator is sampled by enabling the signal $PH_3$. When all the phases are low, the comparator keeps the hold status.

Generally, driving schemes of phases $PH_1$, $PH_2$ and $PH_3$ for a three-phase comparator are known in the art, thus a more detailed description will not be provided herein.

As noted, the charge pump circuit block 402 may inject or sink a fixed current $I_{CP}$ into/from node 414 depending on the value of the command signal $CP_{CMD}$, which is a replica of the digital signal $V_{COMP}$. At steady-state condition, the digital signal $V_{COMP}$ has a duty cycle which is approximately 50%; therefore, in a complete period of signal $V_{COMP}$, the total charge integrated by the ripple filter circuit block 406 at node 414 should ideally be zero, since a current $I_{CP}=I_{BIAS}$ is integrated for half period, and a current $I_{CP}=-I_{BIAS}$ is integrated for another half period. As a result, the average value of the signal $V_M$ should be ideally constant over time.

As a result of a (small) difference (e.g., ±10%) between the positive and negative value of the current $I_{CP}$ provided by the charge pump circuit block 402, the output digital signal $V_{COMP}$ of the comparator 408 may have spurious "double shots", i.e. the output digital signal $V_{COMP}$ may have a duty cycle equal to 0% or 100% for certain periods, depending on the sign of the current error. If such current error in constant over time, the spurious "double shots" may occur periodically, with a certain frequency.

Such "double shots" may thus introduce a subharmonic component in the digital signal $V_{COMP}$ at the node 400, the frequency of the subharmonic component being dependent on the magnitude of the current error.

Figure 8:
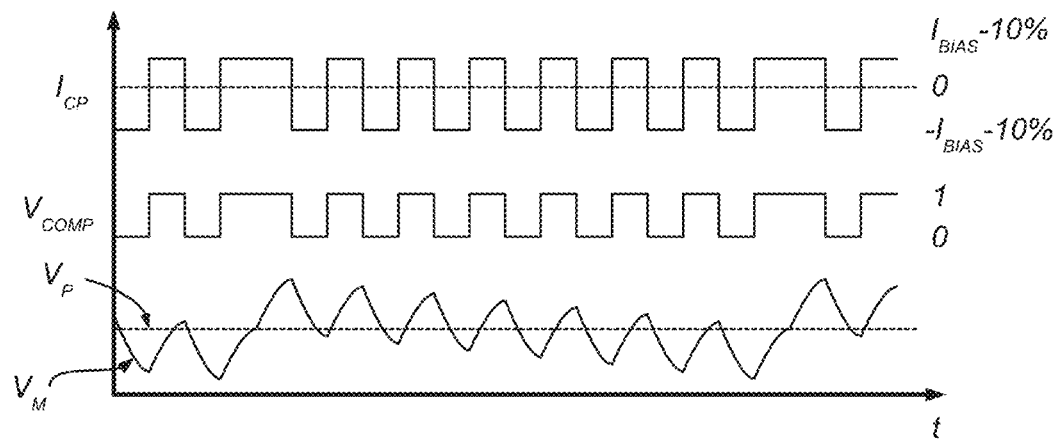

For instance, FIG. 8 is exemplary of an operating condition wherein a current $I_{CP}=I_{BIAS}-10\%$ (equivalently, $I_{CP}=9/10 \cdot I_{BIAS}$) is integrated in the ripple filter circuit block 406 for half period of the signal $V_{COMP}$, and a current $I_{CP}=-I_{BIAS}-10\%$ (equivalently, $I_{CP}=-11/10 \cdot I_{BIAS}$) is integrated for another half period of the signal $V_{COMP}$. In such condition, a "positive double shot" (i.e., the digital signal $V_{COMP}$ skipping a 1→0 commutation) is generated in the signal $V_{COMP}$ every 10 periods, resulting in a subharmonic component of signal $V_{COMP}$ having a frequency equal to $1/10$ of the frequency of signal $V_{COMP}$.

Of course, "negative double shot" may occur in case the sign of the current error is the opposite.

Therefore, in order to limit the occurrence of malfunctions of the converter circuit, one or more embodiments may facilitate reducing the magnitude of the error of the current $I_{CP}$, e.g. providing a maximum current error in the order of ±2% in the worst case scenario.

In one or more embodiments, the comparator 408 and the charge pump circuit block 402 may switch at a high frequency, e.g. in less than 1 ns (1 ns=$10^{-9}$ s), by using the current steering topology. In a current steering topology, the switches $SW_1$ and $SW_2$ may be configured to steer the current on another node (e.g., ground node or power supply node) when switched off. Therefore, the current generator coupled in series with the switches SW (implemented herein, for example, as current mirror) is never switched off and a current can be quickly restored in the switches SW when they are turned on.

Such current steering topology for switches is known in the art (e.g., it is employed in fast digital-to-analog converters), thus a more detailed description will not be provided herein.

In one or more embodiments, the band-pass filter circuit block 404 may be dimensioned in order to provide a stable signal $V_P$ at node 412.

For instance, in one or more embodiments, the first pole of the band-pass filter circuit block 404 may decrease the sensitivity of the additional feedback loop between nodes 102 and 112b, thereby facilitating controlling possible interactions between the main feedback loop of the converter 1 (comprising the blocks 10 and 12) and the additional feedback loop (comprising block 24).

For instance, the first pole of the type-III feedback network (see components $R_1$, $R_2$, $R_3$, $C_1$, $C_2$, $C_3$ in FIG. 1) and the lower pole (i.e., the high-pass pole) of the band-pass filter circuit block 404 may be related and in track, e.g. by using the same resistor and capacitor modules and, possibly, the same trimming procedure (if trimming is performed on those components). The first pole of the type-III feedback network and the lower pole of the band-pass filter circuit block 404 being "in track" means that the frequency values of such singularities should be subject to the same variations, e.g. the same PVT variations.

In one or more embodiments, the second pole of the band-pass filter circuit block 404 (i.e., the low-pass pole) may filter the ripple of the signal $V_{OUT}$ received at node 102 and limit the frequency content of the signal $V_{OUT}$.

Figure 9A:
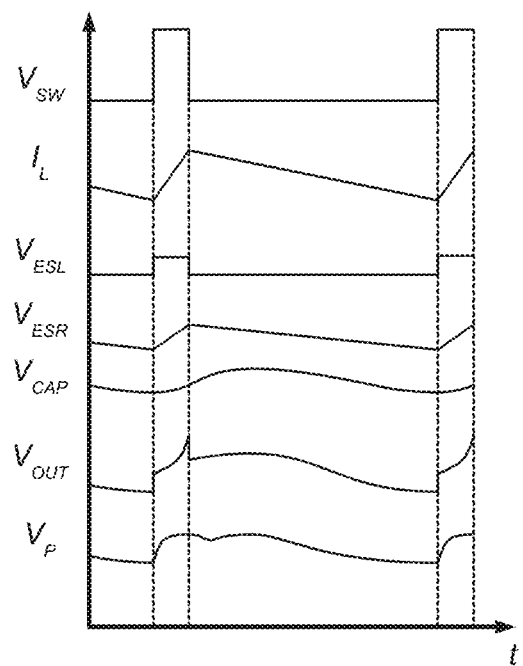

Effects of the band-pass filter circuit block 404 are exemplified in FIG. 9a, which is exemplary of possible time behavior of signals at respective nodes in one or more embodiments, namely:

signal $V_{SW}$ at node 110,
current $I_L$ through inductor $L_{OUT}$,
signal $V_{OUT}$ at node 102,
signal $V_P$ at node 412, and
signals $V_{ESL}$, $V_{ESR}$ and $V_{CAP}$ across the output capacitor $C_{OUT}$.

Figure 9B:
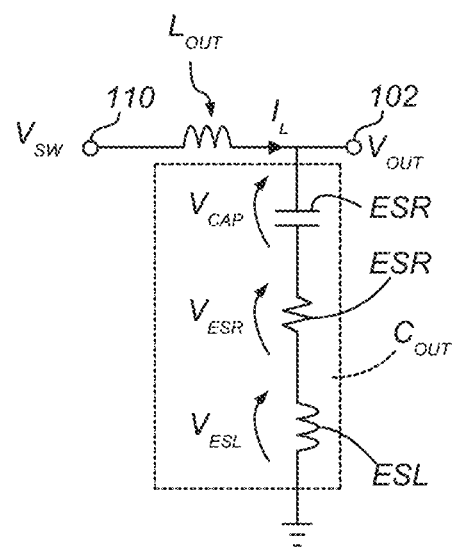
FIG. 9b is exemplary of a circuit model of a (real) capacitor.

In particular, signals $V_{CAP}$, $V_{ESR}$ and $V_{ESL}$ are indicative, respectively, of the voltage drops across the capacitive, resistive and inductive components CAP, ESR, ESL of the output capacitor $C_{OUT}$, as exemplified in the capacitor model of FIG. 9b.

Figure 10:
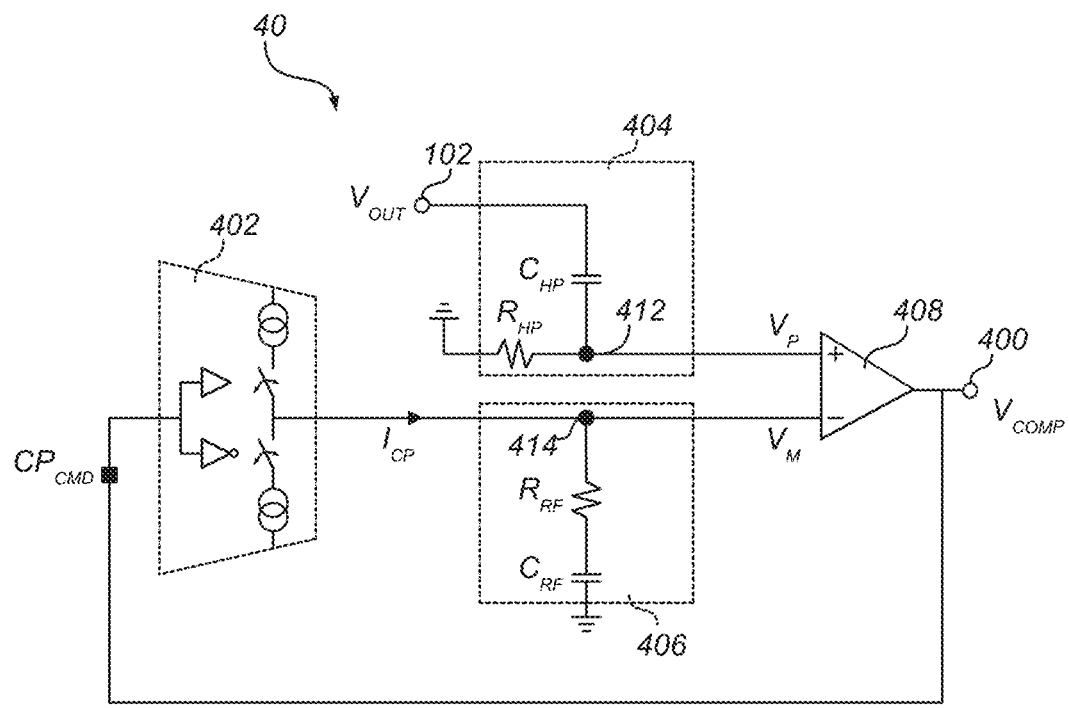
FIG. 10 is a simplified circuit scheme of possible implementation details of embodiments.
Figure 11:
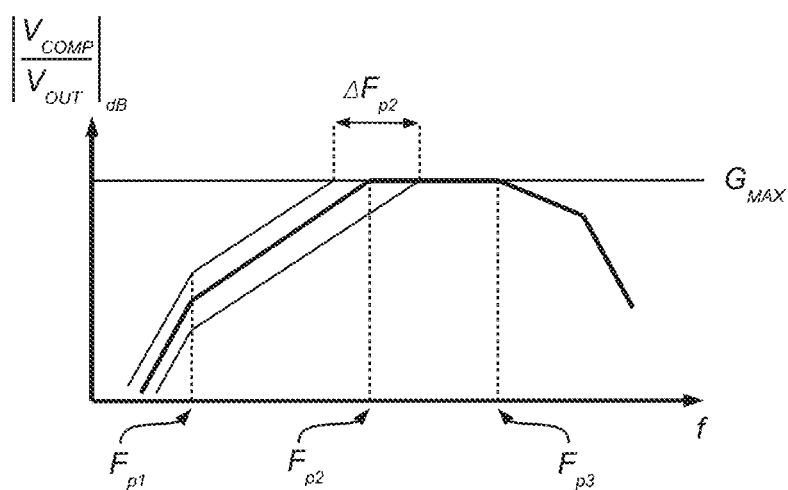
FIG. 11 is exemplary of possible frequency response of the circuit exemplified in FIG. 6.

Frequency response of a sensing portion 40 of a sensing circuit block 24 in one or more embodiments may be analyzed with reference to FIGS. 10 and 11.

As a result of the sensing portion 40 operating as a delta modulator, e.g. a 1-bit delta modulator, the duty cycle of the respective output signal $V_{COMP}$ may be indicative of the derivative of the respective input signal $V_{OUT}$. A transfer function from $V_{OUT}$ to $V_{COMP}$ may be computed for a simplified circuit (model), exemplified in FIG. 10, of the sensing portion 40 exemplified in FIG. 6. Such circuit of FIG. 10 may be derived from the complete circuit of FIG. 6 under some simplifying assumptions, namely:

neglecting both capacitors $C_{COMP}$ coupled at nodes 412 and 414, respectively, whose main function is to balance the comparator kick-back injection and to reduce the sensitivity to the parasitic components ESL and ESR at the output node 102; the singularities (e.g., poles in the transfer function) due to the parasitic components ESL and ESR are located at frequencies higher than the upper limit of the LTE loop bandwidth, which is a function of the comparator clock frequency CLK_LTE;

neglecting the filter circuit block 600 between nodes 422 and 410, whose main function is to reduce the coupling between the signal $V_{OUT}$ and the bias current $I_{BIAS}$ provided by the charge pump circuit block 402; and considering node 410 coupled to the reference (ground) node GND, which is a DC bias condition but has no impact on the computation of the frequency transfer function.

Under the above mentioned assumptions, the simplified circuit (model) exemplified in FIG. 10 may be obtained, and in the closed loop condition also the condition $V_P=V_M$ may be considered. Therefore, the following transfer function may be computed:

$$\frac{\delta V_{COMP}(s)}{\delta V_{OUT}(s)} = \frac{sC_{HP}R_{HP}}{1+sC_{HP}R_{HP}} \cdot \frac{sC_{RF}R_{RF}}{1+sC_{RF}R_{RF}} \cdot \frac{1}{2R_{RF}I_{CP}}$$

wherein the first factor is due to the band-pass filter circuit block 404, and the second and third factors are due to the delta modulator behavior of the clocked comparator 408 cooperating with the charge pump circuit block 402.

A diagram of the transfer function from $V_{OUT}$ to $V_{COMP}$ under the above mentioned simplifying assumptions is exemplified in Figure ii. The transfer function has two zeros approximately located at $f=0$, and three poles whose values may be approximately computed according to the following equations:

$$F_{p1} = \frac{1}{2\pi C_{HP}R_{HP}} \quad F_{p2} = \frac{1}{2\pi C_{RF}R_{RF}} \quad F_{p3} \cong \frac{F_{CLK,LTE}}{2}.$$

Therefore, the frequencies of the poles in the transfer function may also comply with the following conditions:

$$F_{p1} = F_{SW}/10 \quad F_{p2} = 2.5 \cdot F_{SW} \quad F_{p3} \cong 10 \cdot F_{SW}$$

wherein $F_{SW}$ is the switching frequency of the signal $V_{SW}$ at node 110.

In one or more embodiments, the frequency of pole $F_{p2}$ may be tuned by changing the value of the capacitor $C_{RF}$, thus allowing for the frequency of pole $F_{p2}$ for varying in a range $\Delta F_{p2}$.

In one or more embodiments, the maximum value $G_{MAX}$ of the transfer function from $V_{OUT}$ to $V_{COMP}$ may be obtained between the second and third poles, and may be computed according to the following equation:

$$G_{MAX} = \frac{1}{2R_{RF}I_{CP}}.$$

In one or more embodiments, the additional feedback loop (e.g., the sensing circuit block 24) may be almost insensitive to variations of the output signal $V_{OUT}$ at frequencies below the first pole $F_{p1}$, e.g. frequencies below the first pole of the type-III feedback network. In fact, such frequencies may be rather low and the main feedback loop comprising the feedback circuit block 10 may be able to react on such slow variations, e.g. due to slow load transients.

In one or more embodiments, the additional feedback loop (e.g., the sensing circuit block 24) may have a derivative behavior at frequencies between the first pole $F_{p1}$ and the second pole $F_{p2}$. The additional feedback loop may be sensitive to variations of the output signal $V_{OUT}$ and proportional to the derivative of such variations of the output signal $V_{OUT}$.

In one or more embodiments, by tuning the frequency $F_{p1}$ in order to be approximately equal to the first pole of the type-III feedback network, the bandwidth of the additional feedback loop may be extended up to the switching frequency $F_{SW}$.

In one or more embodiments, the additional feedback loop (e.g., the sensing circuit block 24) may saturate at a maximum value $G_{MAX}$, which may be related to the noise performance of the sensing portion 40.

In one or more embodiments, since the value of $R_{HP}$ may be fixed, the ratio $G_{MAX}/F_{p2}$ may be constant and the sensitivity of the additional feedback loop (i.e., the frequency of the second pole $F_{p2}$) may be tuned by varying the value of the capacitor $C_{RF}$.

In one or more embodiments, the frequency of the first pole $F_{p1}$ may be fixed and possibly equal to the frequency of the first pole of the type-III feedback network in the feedback circuit block 10.

It is noted that the analog sensing portion 40 of the sensing circuit block 24 in the additional feedback loop, comprising the filter blocks 404, 406 and 600, the latched (or clocked) comparator 408 and the charge pump circuit block 402, may operate as a delta modulator. In one or more embodiments, the duty cycle of the signal $V_{COMP}$ generated by the sensing portion 40 may thus carry information about variations, in the time order of $1/(10 \cdot F_{p1})$ (due to the band-pass filter circuit block 404), of the (filtered) output signal $V_{OUT}$ from the comparator 1.

One or more embodiments aim at improving the response of the converter 1 to changes of the load 16 coupled thereto. For instance, as a result of the output current $I_L$ increasing due to a load change, the output signal $V_{OUT}$ may change and the sensing portion 40 may react on the derivative of the output signal $V_{OUT}$. Such reaction may result in a local change of the duty cycle of the signal $V_{COMP}$ provided at the output of the sensing portion 40 to the filter portion 42, with such change of the duty cycle of the signal $V_{COMP}$ triggering some actions in the converter 1 in order to react on the load change.

It is noted that, in one or more embodiments, the information carried by the duty cycle of the signal $V_{COMP}$ may be affected by non-idealities of the sensing portion 40, for instance:

non-uniform charge transfer between the charging and discharging phases of the ripple filter circuit block 406 (e.g., due to different clock periods and/or different current values provided by the charge pump circuit block 402, as previously noted), and/or presence of an offset error in the comparator circuit block 408.

In one or more embodiments, the information carried by the duty cycle of the signal $V_{COMP}$ may be used to reconstruct for a limited time window the shape of the output signal $V_{OUT}$, thereby facilitating reacting on the variations of the output signal $V_{OUT}$ of the comparator 1.

For instance, low-pass filtering may facilitate reducing the degree of the derivative applied to the output signal $V_{OUT}$, thus providing locally the shape of the output signal $V_{OUT}$.

Therefore, in one or more embodiments, filtering of the output signal $V_{COMP}$ provided at the output node 400 of the sensing portion 40 may be beneficial for:

reducing the effect of non-idealities of the analog sensing portion 40;

reconstructing locally (i.e., for a limited time window) the shape of the output signal $V_{OUT}$ at node 102 for reacting to load transients; and providing a programmable sensitivity of the additional feedback loop to load transients.

Such filtering of the output signal $V_{COMP}$ may be carried out by means of both analog and digital circuits. Otherwise, it is noted that digital filtering of the information digitally encoded via the delta modulator behavior of the sensing portion 40 may result in higher noise immunity, if compared to analog filtering. Digital filtering may also result in easier tuning of the filter characteristics (e.g., defining precise thresholds).

In one or more embodiments, since the filtering performed in the sensing portion 40 may be designed in order to react to high frequency components in the output signal $V_{OUT}$ (e.g., defining a derivative filter as previously noted), the "downstream" filtering performed in the filter portion 42 may have a low-pass behavior (e.g., defining an integrative filter) which may facilitate reconstructing the shape of the output (voltage) signal $V_{OUT}$.

In one or more embodiments, the filter portion 42 may additionally be designed as a low-power circuit.

Therefore, in one or more embodiments, the filter portion 42 may comprise a moving average filter 421, which is configured to receive the signal $V_{COMP}$ provided at node 400 by the sensing portion 40, and provide an output filtered signal $F_{OUT}$ at node 416. The moving average filter 421 may facilitate reconstructing the shape of the output (voltage) signal $V_{OUT}$.

In one or more embodiments, the number of filter samples of the moving average filter may be constrained by a lower value and an upper value. For instance, the lower value may be defined in order to filter out possible spurious pulses of the comparator 408 due to non-idealities of the analog circuit blocks 402, 404, 406, 600. On the other hand, the upper value may be limited in order to have an additional feedback loop fast enough for reacting to fast load changes at the output node 102 of the converter 1.

For instance, in one or more embodiments the delta-encoded information carried by the signal $V_{COMP}$ may be filtered by means of a moving average filter 421 on twelve samples. The transfer function $TF_{DLP}$ of the digital low-pass filter may thus be the following:

$$TF_{DLP} = \frac{1 - z^{-12}}{1 - z^{-1}}$$

It is noted that different topologies may be used for implementing the digital filter 421.

Figure 12:
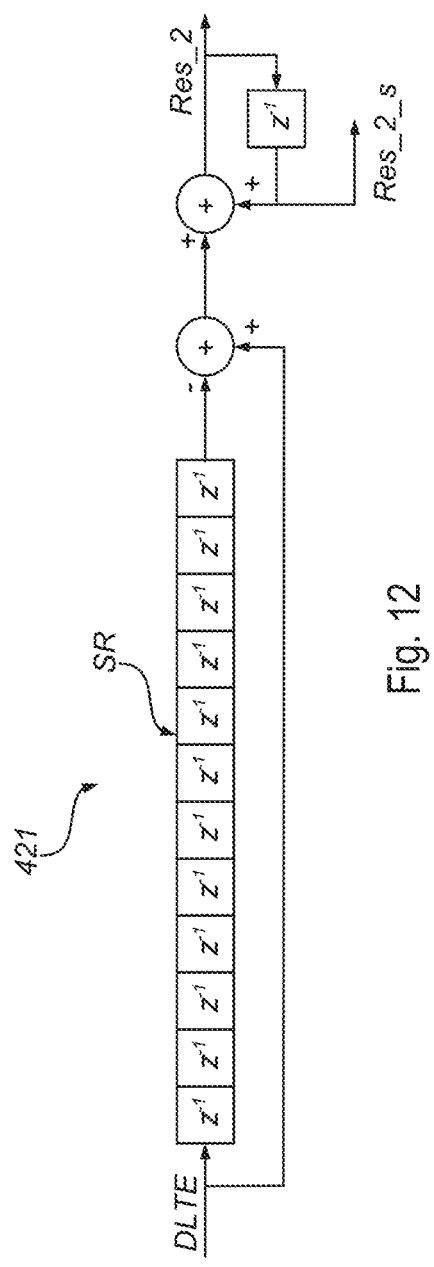
FIGS. 12, 13 and 14 are exemplary of possible implementation details of embodiments.

For instance, FIG. 12 is exemplary of a possible implementation of the moving average filter 421 with a shift register SR with twelve 1-bit samples, one 2-bits adder, one 4-bits adder and one 4-bits sampler.

Figure 13:
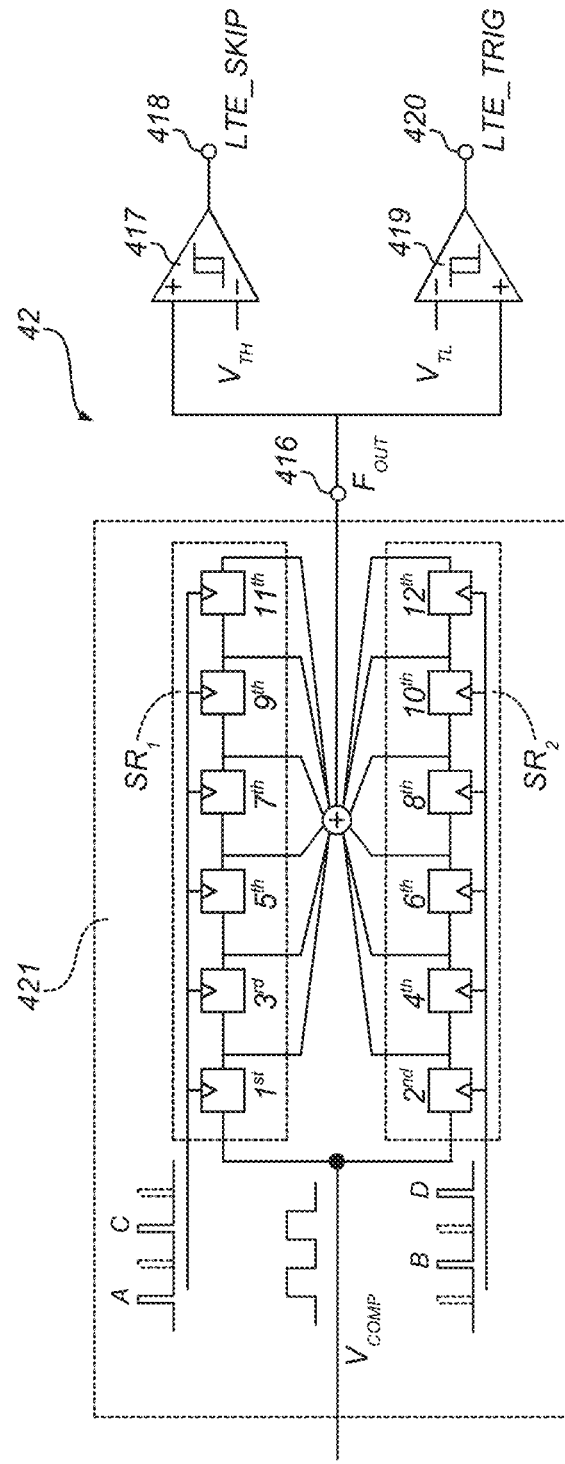

FIG. 13 is exemplary of another possible implementation of the moving average filter 421. The moving average filter 421 exemplified in FIG. 13 comprises two shift registers $SR_1$, $SR_2$ and one 4-bits adder. Each of the shift registers $SR_1$, $SR_2$ may have half the length of the shift register SR exemplified in FIG. 12, and the two registers $SR_1$, $SR_2$ may be configured to store alternatively a current value of the digital signal $V_{COMP}$ at half the frequency of the delta-encoded signal $V_{COMP}$.

It is noted that the implementation of the moving average filter 421 exemplified in FIG. 13 may be advantageous in reducing power consumption at steady state (charging the transfer function $TF_{DLP}$ of a further sampling period). In fact, since the delta-encoded signal $V_{COMP}$ normally has a duty cycle of 50% at steady state, one of the two shift registers $SR_1$, $SR_2$ (e.g., $SR_1$) would store 0s only, and the other of the two shift registers $SR_1$, $SR_2$ (e.g., $SR_2$) would store 1s only, thereby reducing the power consumption of both chains of registers since the outputs of the memory elements do not change, i.e. commutation of the memory elements is avoided in steady-state conditions.

In one or more embodiments, the output signal $F_{OUT}$ of the moving average filter 421 may be compared with two threshold values $V_{TH}$ and $V_{TL}$ at respective comparators 417 and 419.

The output signal $F_{OUT}$ may be compared to a first threshold $V_{TH}$ in a first comparator with hysteresis 417, thereby generating a first output digital signal LTE_SKIP at a node 418. The signal LTE_SKIP may be set to high as a result of the signal $F_{OUT}$ increasing to the threshold $V_{TH}$ and set to low as a result of the signal $F_{OUT}$ returning to its average value (i.e., when the converter operates at steady state and signal $V_{COMP}$ has duty cycle of 50%).

The output signal $F_{OUT}$ may be compared to a second threshold $V_{TL}$ in a second comparator with hysteresis 419, thereby generating a second output digital signal LTE_TRIG at a node 420. The signal LTE_TRIG may be set to high as a result of the signal $F_{OUT}$ decreasing to the threshold $V_{TL}$ and set to low as a result of the signal $F_{OUT}$ increasing to the threshold $V_{TH}$. Additionally, the signal LTE_TRIG may be set to high only if the output signal $V_{OUT}$ is lower than the reference voltage $V_{REF}$ at node 100.

Therefore, the output digital signals LTE_TRIG and LTE_SKIP may be provided by the sensing circuit block 24 to the control circuit block 22 to trigger or skip, respectively, a pulse in the signal $PWM_d$ provided at node 112b for driving the switching stage 14.

In fact, in one or more embodiments, the digital signal LTE_TRIG may commute to high, e.g. in case of an increase of the output load, with such commutation to high resulting in the signal $PWM_d$ being forced to high in order to provide charge to the output capacitance $C_{OUT}$.

Similarly, in one or more embodiments, the digital signal LTE_SKIP may commute to high, e.g. in case of a release (decrease) of the output load, with such commutation to high resulting in the signal $PWM_d$ being forced to low in order to inhibit switching activity of the switching stage 14.

Triggering additional pulses of the signal $PWM_d$ by means of the signal LTE_TRIG through the control block 22 may be a time-relevant issue. Thus, in one or more embodiments, the signal path from node 420 to node 112b (i.e., the signal path allowing the propagation of signal LTE_TRIG which affects the signal $PWM_d$) may comprise combinational logic circuits (only).

Skipping unwanted pulses of the signal $PWM_d$ by means of the signal LTE_SKIP through the control block 22 may involve accurate operation. For instance, skipping $PWM_d$ pulses should not be performed when the output signal $V_{OUT}$ is lower than the reference signal $V_{REF}$. Thus, in order to avoid the masking of only unnecessary charging pulses, and thus stopping the switching functionality of the switching stage 14 when not needed, a clocked logic with FSM (Finite State Machine) may be used instead of involving combinatorial logic (only).

In one or more embodiments, digital filtering operated by the filter portion 42 may also facilitate masking the output of the additional feedback loop when the related effects on the output signal $V_{OUT}$ are not predictable.

For instance, operation of the additional feedback loop (e.g., operation of the sensing circuit block 24 and the control circuit block 22) may be disabled by means of a timing mask, implemented through the digital filter portion 42, during the start-up phase of the converter 1, before the converter reaches a steady-state condition.

In one or more embodiments, signals LTE_TRIG and LTE_SKIP are provided by the sensing circuit block 24 to the control circuit block 22. The control circuit block 22 may be configured to generate a drive signal $PWM_d$ for driving the switching stage 14, with the drive signal $PWM_d$ being generated as a function of a combination of information retrieved from the PWM-modulated control signal $PWM_c$ at the output 112a of the main feedback loop 10, 12 and signals LTE_TRIG and LTE_SKIP.

In particular, in one or more embodiments, the drive signal $PWM_d$ is generated by propagating the PWM-modulated control signal $PWM_c$ from node 112a to node 112b, and "overriding" high values, resp. low values, of such propagated signal with low values, resp. high values, as a result of the digital signal LTE_SKIP, resp. LTE_TRIG, being high (or, in general, being asserted).

In one or more embodiments, the signal LTE_SKIP may act inhibiting the transfer of charge from the inductor $L_{OUT}$ to the output node 102 possibly required by the main feedback loop. For instance, an AND logic gate may be placed along the generation path of the on-time trigger signal, the AND logic gate having one input configured to receive a complemented replica of the signal LTE_SKIP (see, for instance, FIG. 14).

In one or more embodiments, a rather sophisticated (combinational) elaboration of signal LTE_TRIG may be performed in the control circuit block 22. For instance, such elaboration may aim at reducing the occurrence of spurious subharmonic components in the output signal $V_{OUT}$, which may be due to a possible systematic intervention of the additional feedback loop (as previously described with reference to FIG. 8).

Figure 14:
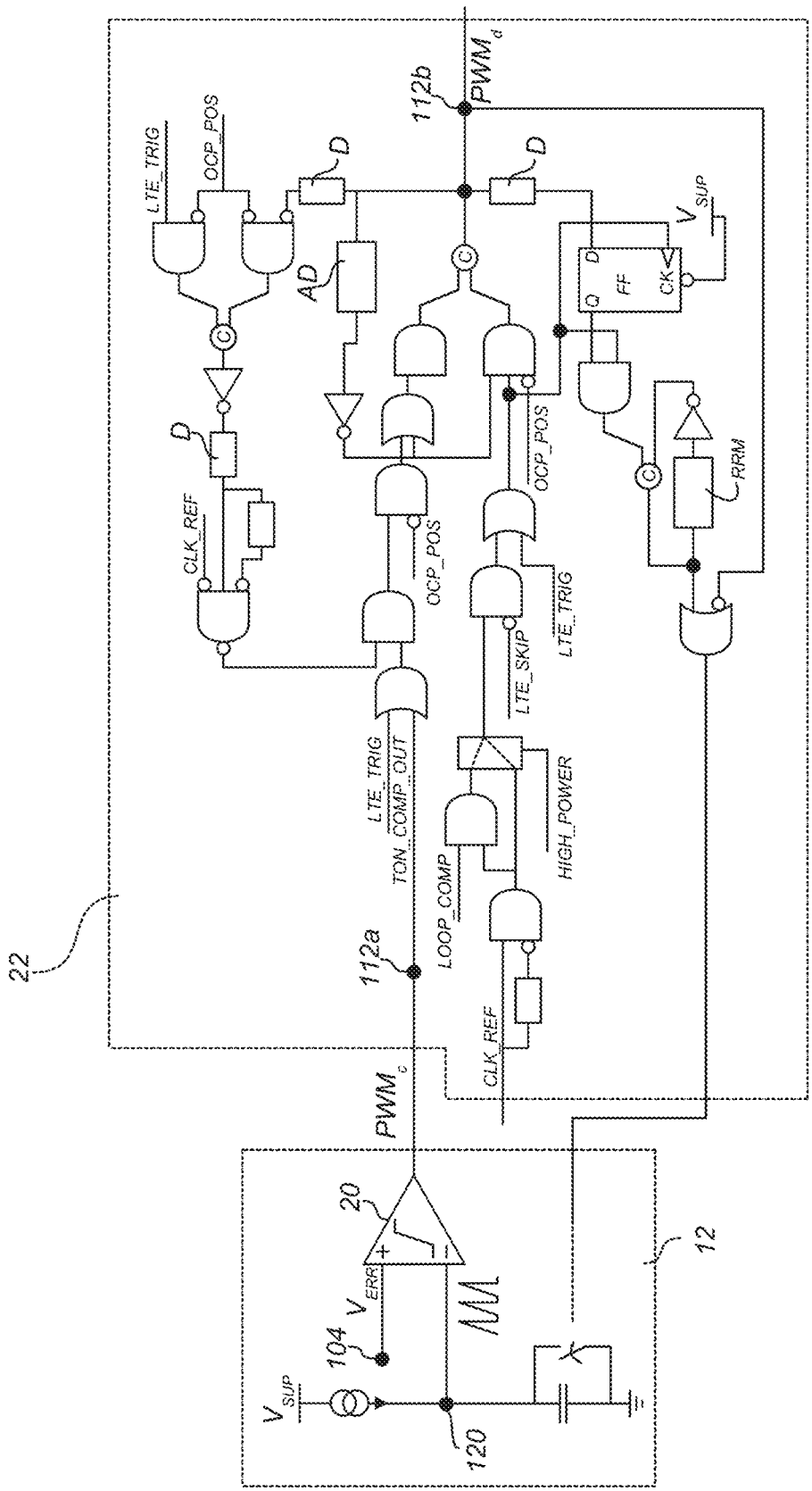

FIG. 14 is exemplary of a possible implementation of a control circuit block 22 for use in one or more embodiments, according to the operation logic described previously.

In FIG. 14, in addition to logic gates known per se such as AND, OR, and NOT logic gates, the following blocks may be identified:

D: delay block (e.g., 2 ns delay, 3 ns delay, etc.);
AD: asymmetrical rise/fall minimum $T_{ON}/T_{OFF}$ delay;
RRM: reset ramp mask;
C: combinational blocks having two inputs A and B and one output Z, realizing the following logic function:

| A | B | Z |
|---|---|---|
| 0 | 0 | 0 |
| 0 | 1 | $Z^{-1}$ |
| 1 | 0 | $Z^{-1}$ |
| 1 | 1 | 1 |

Examples of operation of one or more embodiments according to the architecture exemplified in FIG. 14 are reported here below:

a) LTE_TRIG started and finished during a $T_{OFF}$ time, approximately at the middle of a switching period→$T_{ON}$ end pulse is generated and LTE_TRIG=PWM;

b) LTE_TRIG started during a $T_{OFF}$ time and finished in correspondence to the beginning of a switching period→ the reset pulse is not generated and the PWM signal remains high;

c) LTE_TRIG started during a $T_{ON}$ time→ the reset pulse is not generated and the $T_{ON}$ time is determined by the output of the $T_{ON}$ comparator 20;

d) LTE_TRIG started during a $T_{OFF}$ time and finished in correspondence to the high-to-low transition of the signal CLK_REF→$T_{ON}$ end pulse is generated and LTE_TRIG=PWM;

e) Positive Over Current (OCP_POS) event when LTE_TRIG=1→$T_{ON}$ time stopped and $PWM_d$ reset.

The signal OCP_POS may be indicative of a positive over-current event. As a result of such signal indicating an over-current, an over-current protection may be triggered by resetting the signal $PWM_d$ for a certain time interval. Such operation has priority over the functionality of the LTE loop, since it provides a protection against possible damages to the circuit.

It is noted that other possible operating conditions may occur in the control circuit block 22 according to different possible values of signals LTE_TRIG, LTE_SKIP and others.

One or more embodiments may thus provide the advantages of both fixed-frequency and standard constant on-time (COT) converter architectures, e.g. high immunity to noise and good output dynamic performance.

One or more embodiments may provide improved performance in case of rapid load step with respect to conventional fixed-frequency converters while keeping under control the switching phase of the converter, e.g. allowing a disoverlapping and/or phase shift in presence of different points of load.

One or more embodiments may be advantageous in limiting power consumption.

One or more embodiments may allow using the same circuitry to improve the response of the system even in case of fast load current release.

One or more embodiments may facilitate modulating the entity of the correction to the PWM-modulated signal $PWM_c$ by means of the additional feedback loop as a function of the amplitude and slope of load transients steps, thereby reducing the risk of large undershoot and overshoot if any of the converter signals is changed (e.g., input voltage $V_{IN}$ and output signal $V_{OUT}$).

One or more embodiments may facilitate reducing intrinsic converter inaccuracies by operating a digital moving average filtering on the output of the comparator 408, thus providing improved sensitivity with reduced risk of spurious interventions and anomalous behavior at constant output load (i.e., at steady state).

One or more embodiments may be almost insensitive to the shape of the output ripple thanks to a filtering operation provided by the analog sensing portion.

One or more embodiments may not need external components, with the whole circuit being possibly fully integrated on silicon.

One or more embodiments may thus relate to a converter circuit (e.g., 1), comprising:

an input node (e.g., 106) configured to receive an input signal (e.g., $V_{IN}$) and an output node (e.g., 102) configured to provide a converted output signal (e.g., $V_{OUT}$) to a load (e.g., 16);

a switching power stage (e.g., 14) configured to receive the input signal and an on-off drive signal (e.g., $PWM_d$) switching between an on-state and an off-state, the switching power stage configured to provide at a respective output node (e.g., 110) a switching power signal (e.g., $V_{SW}$);

a reactive output network (e.g., $L_{OUT}$, $C_{OUT}$) between the respective output node of the switching power stage and the output node, the reactive output network configured to provide the converted output signal to the load, wherein the circuit may comprise:

i) a first feedback signal path (e.g., 10, 12) comprising:

a comparator circuit (e.g., 10) configured to compare the converted output signal at the output node with a reference signal (e.g., $V_{REF}$) and to generate an error signal (e.g., $V_{ERR}$) at a respective output node (e.g., 104), and a PWM generator circuit (e.g., 12) configured to receive at a respective input node (e.g., 120) a ramp signal (e.g., $V_{RAMP}$) at a first frequency (e.g., CLK_REF), the PWM generator circuit coupled to the comparator circuit to receive the error signal therefrom and configured to generate a PWM-modulated control signal (e.g., $PWM_c$) having the first frequency, the PWM-modulated control signal having respective on- and off-times which are a function of the error signal;

ii) a second feedback signal path comprising an output variation sensing circuit block (e.g., 24) configured to sense the converted output signal at the output node and to generate at least one output variation signal (e.g., LTE_TRIG, LTE_SKIP) indicative of variations of the converted output signal over time, wherein the circuit may comprise a controller circuit block (e.g., 22) coupled to the PWM generator circuit in the first feedback signal path and to the output variation sensing circuit block in the second feedback signal path, wherein the controller circuit block is sensitive to the PWM-modulated control signal and the at least one output variation signal, the controller circuit block configured to generate the on-off drive signal for the switching power stage from the PWM-modulated control signal by increasing resp. decreasing the time the on-off drive signal is in the on-state as a result of the converted output signal decreasing resp. increasing.

As exemplified in FIG. 5, increasing the (overall or cumulative) time over which the on-off drive signal $PWM_d$ is in the on-state as a result of a decrease sensed in the output signal $V_{OUT}$ may involve forcing the drive signal $PWM_d$ to the on-state by "inserting" a pulse between subsequent pulses in the sequence of pulses in the drive signal $PWM_d$.

In one or more embodiments, increasing the (overall) time over which the on-off drive signal $PWM_d$ is in the on-state may be effected in other ways such as, for instance:

increasing the duration of the on-times of the pulses in the sequence of pulses in the drive signal $PWM_d$, and/or reducing the distance between adjacent pulses in the sequence.

Similarly, decreasing the (overall or cumulative) time over which the on-off drive signal $PWM_d$ is in the off-state may be effected in various ways such as, for instance:

"deleting" at least a portion of a pulse between subsequent pulses in the sequence of pulses in the drive signal $PWM_d$; it will be appreciated that such deleting may involve a pulse as a whole or just "slicing" the pulse by forcing to the off-state an end or intermediate portion of the pulse, and/or reducing the duration of the on-times of the pulses in the sequence of pulses in the drive signal $PWM_d$, and/or increasing the distance between adjacent pulses in the sequence.

In one or more embodiments, the at least one output variation signal may comprise:

a first output variation signal (e.g., LTE_TRIG) indicative of the converted output signal decreasing, and a second output variation signal (e.g., LTE_SKIP) indicative of the converted output signal increasing.

In one or more embodiments, the controller circuit block is configured to generate the on-off drive signal for the switching power stage by:

propagating to the switching power stage the PWM-modulated control signal received from the PWM generator circuit, and i) forcing the on-off drive signal for the switching power stage to the on-state as a result of the first output variation signal being indicative of the converted output signal decreasing;

ii) forcing the on-off drive signal for the switching power stage to the off-state as a result of the second output variation signal being indicative of the converted output signal increasing.

In one or more embodiments, the output variation sensing circuit block may comprise:

a sensing portion (e.g., 40) configured to sense the converted output signal at the output node by applying a delta modulation to the converted output signal at a second frequency (e.g., CLK_LTE), thereby generating a respective output digital signal (e.g., $V_{COMP}$) having a duty cycle which is a function of variations of the converted output signal over time; and a filter portion (e.g., 42) configured to:

receive the output digital signal from the sensing portion and apply low-pass filtering to the output digital signal, thereby generating a respective output filtered signal (e.g., $F_{OUT}$), and compare the output filtered signal to at least one threshold value to generate the at least one output variation signal.

In one or more embodiments, the second frequency may be higher than the first frequency (CLK_REF), preferably at least one order of magnitude higher (i.e., at least 10 times higher) than the first frequency (CLK_REF).

In one or more embodiments, the filter portion may comprise a moving average digital filter (e.g., 421) configured to apply low-pass filtering to the output digital signal, thereby generating the respective output filtered signal.

In one or more embodiments, the moving average digital filter may comprise two shift registers (e.g., $SR_1$, $SR_2$) configured to alternatively store a current value of the output digital signal, with each of the two shift registers being operated at a frequency which is half of the second frequency.

In one or more embodiments, the sensing portion may comprise:

a band-pass filter circuit block (e.g., 404) configured to filter the converted output signal sensed at the output node and generate an intermediate filtered signal (e.g., $V_P$) indicative of the value of the converted output signal;

a charge pump circuit block (e.g., 402) configured to inject or sink a certain current (e.g., $I_{CP}$) into/from a respective filter circuit block (e.g., 406), thereby generating an oscillating signal (e.g., $V_M$) at a respective output node (e.g., 414) of the respective filter circuit block; and a clocked comparator (e.g., 408) configured to compare the intermediate filtered signal to the oscillating signal at the second frequency, thereby generating the respective output digital signal.

One or more embodiments may comprise a converter compensation network (e.g., $R_1$, $R_2$, $R_3$, $C_1$, $C_2$, $C_3$), preferably a type-III compensation network, the compensation network providing at least one compensating pole of the transfer function of the converter at a certain frequency, wherein the band-pass filter circuit block has a transfer function with a respective pole at said certain frequency of said at least one compensating pole.

In one or more embodiments, the controller circuit block may comprise a combinational logic circuit configured to force the on-off drive signal to the on-state as a result of the first output variation signal being indicative of the converted output signal decreasing.

In one or more embodiments, the controller circuit block may be configured to increase the time the on-off drive signal is in the on-state as a result of the converted output signal decreasing and the converted output signal being lower than the reference signal.

In one or more embodiments, an electronic component may comprise a plurality of circuits according to one or more embodiments, the circuits in the plurality of circuits being configured to receive an input signal at respective input nodes and provide respective output signals at respective output nodes.

In one or more embodiments, a device may comprise at least one circuit according to one or more embodiments and a load coupled to the output node in the at least one circuit to receive a converted output signal therefrom.

In one or more embodiments, the electronic component may comprise a plurality of circuits according to one or more embodiments, wherein the circuits in the plurality of circuits have respective output nodes coupled to different points of load to provide respective converted output signals to the different points of load.

In one or more embodiments, a method of operating a circuit according to one or more embodiments may comprise:
applying an input signal to the input node,
coupling a load or loads to the output node or nodes.

Without prejudice to the underlying principles, the details and embodiments may vary, even significantly, with respect to what has been described by way of example only, without departing from the extent of protection.

The extent of protection is defined by the annexed claims.

What is claimed is:

1. A converter circuit, comprising:
an input node configured to receive an input signal and an output node configured to provide a converted output signal to a load;
a switching power stage configured to receive said input signal and an on-off drive signal switching between an on-state and an off-state, the switching power stage configured to provide a switching power signal at a respective output node;
a reactive output network between said respective output node of the switching power stage and said output node, the reactive output network configured to provide said converted output signal to said load,
wherein the circuit comprises:
a first feedback signal path comprising:
a comparator circuit configured to compare said converted output signal at said output node with a reference signal and to generate an error signal at a respective output node, and
a PWM generator circuit configured to receive at a respective input node a ramp signal at a certain first frequency, the generator circuit coupled to the comparator circuit to receive said error signal therefrom and configured to generate a PWM-modulated control signal having said certain first frequency, the PWM-modulated control signal having respective on- and off- times which are a function of said error signal;
a second feedback signal path originating at said output node comprising an output variation sensing circuit block configured to sense said converted output signal at said output node and to generate at least one output variation signal indicative of variations of said converted output signal over time, wherein an input of the output variation sensing circuit block is directly coupled to said output node,
wherein the circuit comprises a controller circuit block coupled to the PWM generator circuit in the first feedback signal path and to the output variation sensing circuit block in the second feedback signal path, wherein the controller circuit block is sensitive to said PWM-modulated control signal and said at least one output variation signal, the controller circuit block configured to generate said on-off drive signal for the switching power stage from said PWM-modulated control signal by increasing or decreasing the time the on-off drive signal is in the on-state as a result of said converted output signal decreasing or increasing.

2. The converter circuit of claim 1, wherein said at least one output variation signal comprises:
a first output variation signal indicative of said converted output signal decreasing, and
a second output variation signal indicative of said converted output signal increasing;
and wherein said controller circuit block is configured to generate said on-off drive signal for the switching power stage by:
propagating to the switching power stage said PWM-modulated control signal received from said PWM generator circuit;
forcing said on-off drive signal for the switching power stage to the on-state as a result of said first output variation signal being indicative of said converted output signal ($V_{out}$) decreasing; and
forcing said on-off drive signal for the switching power stage to the off-state as a result of said second output variation signal being indicative of said converted output signal increasing.

3. The converter circuit of claim 2, wherein said controller circuit block comprises a combinational logic circuit configured to force said on-off drive signal to the on-state as a result of said first output variation signal being indicative of said converted output signal decreasing.

4. The converter circuit of claim 1, wherein said output variation sensing circuit block comprises:
a sensing portion configured to sense said converted output signal at said output node by applying a delta modulation to said converted output signal at a certain second frequency, thereby generating a respective output digital signal having a duty cycle which is a function of variations of said converted output signal over time; and a filter portion configured to:
receive said output digital signal from said sensing portion and apply low-pass filtering to said output digital signal, thereby generating a respective output filtered signal, and
compare said output filtered signal to at least one threshold value to generate said at least one output variation signal.

5. The converter circuit of claim 4, wherein said certain second frequency is higher than said certain first frequency, preferably at least one order of magnitude higher than said certain first frequency.

6. The converter circuit of claim 4, wherein said filter portion comprises a moving average digital filter configured to apply low-pass filtering to said output digital signal, thereby generating said respective output filtered signal.

7. The converter circuit of claim 6, wherein said moving average digital filter comprises two shift registers configured to alternatively store a current value of said output digital signal, with each of the two shift registers being operated at a frequency which is half of said certain second frequency.

8. The converter circuit of claim 4, wherein said sensing portion comprises:
a band-pass filter circuit block configured to filter said converted output signal sensed at said output node and generate an intermediate filtered signal indicative of the value of said converted output signal;
a charge pump circuit block configured to inject or sink a certain current into/from a respective filter circuit block, thereby generating an oscillating signal at a respective output node of said respective filter circuit block; and
a clocked comparator configured to compare said intermediate filtered signal to said oscillating signal at said certain second frequency, thereby generating said respective output digital signal.

9. The converter circuit of claim 8, comprising a converter compensation network, the compensation network providing at least one compensating pole of the transfer function of the converter at a certain frequency, wherein said band-pass filter circuit block has a transfer function with a respective pole at said certain frequency of said at least one compensating pole.

10. The converter circuit of claim 1, wherein said controller circuit block is configured to increase the time the on-off drive signal is in the on-state as a result of said converted output signal decreasing and said converted output signal being lower than said reference signal.

11. The converter circuit of claim 1, comprising:
a load coupled to said output node in said at least one circuit to receive a converted output signal therefrom.

12. An electronic component, comprising a plurality of converter circuits according to claim 1 integrated on a common substrate, the converter circuits in said plurality of converter circuits being configured to receive said input signal at respective input nodes and provide respective output signals at respective output nodes.

13. An electronic component, comprising a plurality of converter circuits according to claim 1, wherein the converter circuits in said plurality of circuits have respective output nodes coupled to different points of load to provide respective converted output signals to said different points of load.

14. A converter circuit, comprising:
an input node configured to receive an input signal and an output node configured to provide a converted output signal to a load;
a switching power stage configured to receive the input signal and an on-off drive signal switching between an on-state and an offstate, the switching power stage configured to provide a switching power signal at a respective output node;
a reactive output network between the respective output node of the switching power stage and the output node, the reactive output network configured to provide the converted output signal to the load;
a first feedback signal path originating at the output node and in communication with the switching network, the first feedback path comprising a comparator circuit and a PWM generator circuit coupled to the comparator circuit; and
a second feedback signal path originating at the output node and in communication with the switching network, the second feedback path comprising an output variation sensing circuit block, wherein an input of the variation sensing circuit block is directly coupled to said output node.

15. The converter circuit of claim 14, wherein the comparator circuit is configured to compare the converted output signal at the output node with a reference signal and to generate an error signal at a respective output node.

16. The converter circuit of claim 14, wherein the PWM generator circuit is configured to receive at a respective input node a ramp signal at a certain first frequency, the generator circuit coupled to the comparator circuit to receive the error signal therefrom and configured to generate a PWM-modulated control signal having the certain first frequency, the PWM-modulated control signal having respective on- and off- times which are a function of the error signal.

17. The converter circuit of claim 14, wherein the output variation sensing circuit block is configured to sense the converted output signal at the output node and to generate at least one output variation signal indicative of variations of the converted output signal over time.

18. The converter circuit of claim 14, wherein the circuit comprises a controller circuit block coupled to the PWM generator circuit in the first feedback signal path and to the output variation sensing circuit block in the second feedback signal path, wherein the controller circuit block is sensitive to the PWM-modulated control signal and the at least one output variation signal, the controller circuit block configured to generate the on-off drive signal for the switching power stage from the PWM-modulated control signal by increasing or decreasing the time the on-off drive signal is in the on-state as a result of the converted output signal decreasing or increasing.

19. The converter circuit of claim 14, wherein the comparator circuit in the first feedback path comprises a compensation circuit.

20. A converter circuit comprising:
a switching stage coupled to an input node of the converter circuit;
a reactive network coupled between the switching stage and an output node of the converter circuit;
a control circuit coupled to the switching stage;
a first feedback path coupled to the control circuit and originating at the output node of the converter circuit, the first feedback path comprising a compensation network coupled to a modulator circuit; and
a second feedback path coupled to the control circuit and originating at the output node of the converter circuit, the second feedback path comprising a sensing circuit, wherein an input of the sensing circuit is directly coupled to the output node.

* * * * *

UNITED STATES PATENT AND TRADEMARK OFFICE
CERTIFICATE OF CORRECTION

PATENT NO. : 11,165,346 B2  
APPLICATION NO. : 16/583845  
DATED : November 2, 2021  
INVENTOR(S) : Giacomo Petracca Page 1 of 1

It is certified that error appears in the above-identified patent and that said Letters Patent is hereby corrected as shown below:

In the Claims

Claim 2, Column 20; Line 47; delete "($V_{OU}$)" insert --($V_{OUT}$)--

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*